United States Patent
Kleinschrodt et al.

[11] Patent Number: 6,145,772
[45] Date of Patent: Nov. 14, 2000

[54] DEVICE FOR WINDING COILS IN AXIAL GROOVES OF ROTATIONALLY SYMMETRICAL BODIES OF ELECTRIC EQUIPMENT

[75] Inventors: Rudolf Kleinschrodt, Oetwil; Urs Rieser, Rudolfstetten, both of Switzerland

[73] Assignee: ATS Automation Tooling Systems Inc., Cambridge, Canada

[21] Appl. No.: 09/234,305

[22] Filed: Jan. 21, 1999

[30] Foreign Application Priority Data

Jan. 21, 1998 [CH] Switzerland .............. 0129/98

[51] Int. Cl.7 .................................... H02K 15/09
[52] U.S. Cl. .......................... 242/433.3; 29/596
[58] Field of Search .............. 242/433.2, 433.3, 242/433.4; 29/596

[56] References Cited

U.S. PATENT DOCUMENTS

| | | | |
|---|---|---|---|
| 2,348,948 | 5/1944 | Allen | 242/433.3 |
| 2,949,554 | 8/1960 | Biddison | |
| 3,187,784 | 6/1965 | Caldwell | |
| 3,927,456 | 12/1975 | Dammar | |
| 3,927,469 | 12/1975 | Dammar | 242/433.4 X |
| 3,973,738 | 8/1976 | Miller | 242/433.3 |
| 4,052,783 | 10/1977 | Shively | 242/433.3 X |
| 4,459,742 | 7/1984 | Banner | 242/433.3 X |
| 5,257,744 | 11/1993 | Lombardi et al. | 242/433.4 |
| 5,310,124 | 5/1994 | Linari et al. | 242/433.3 X |
| 5,335,868 | 8/1994 | Iwase | 242/433.3 |
| 5,470,025 | 11/1995 | Banner et al. | 242/433.3 |

FOREIGN PATENT DOCUMENTS

| | | |
|---|---|---|
| 0 703 658 | 3/1996 | European Pat. Off. . |
| 2 660 124 | 9/1991 | France . |
| 456 754 | 7/1968 | Switzerland . |

*Primary Examiner*—Donald P. Walsh
*Assistant Examiner*—Emmanuel M. Marcelo
*Attorney, Agent, or Firm*—R. Craig Armstrong

[57] ABSTRACT

In a device for winding coils from at least two parallel guided winding wires in axial grooves arranged on the outer circumference of rotationally symmetrical bodies of electric equipment and for looping the winding wires around two contact hooks that are annularly arranged on the end surface of the body and separated from one another, the winding wires are inserted into the grooves by a winding arm that can be turned about a rotational axis (y) which lies perpendicular to the rotational axis (x) of the body. A wire guide with separated wire outlets for the two winding wires is arranged on the free end of the winding arm. The wire guide can be turned between a winding position in which the winding wires adjoin one another in essentially parallel fashion so as to insert the wires into the grooves, and a looping position, in which the winding wires are spread apart so as to loop the wires around the contact hooks.

15 Claims, 1 Drawing Sheet

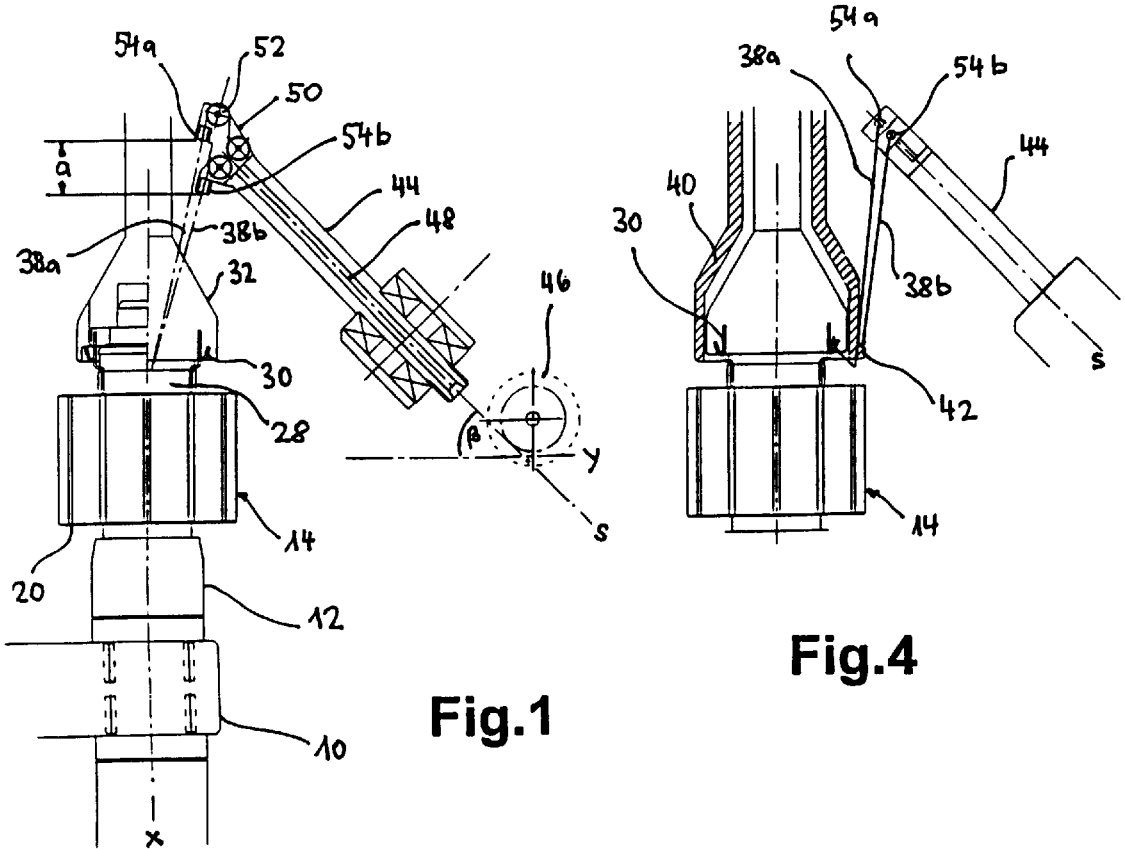
Fig.1
Fig.4
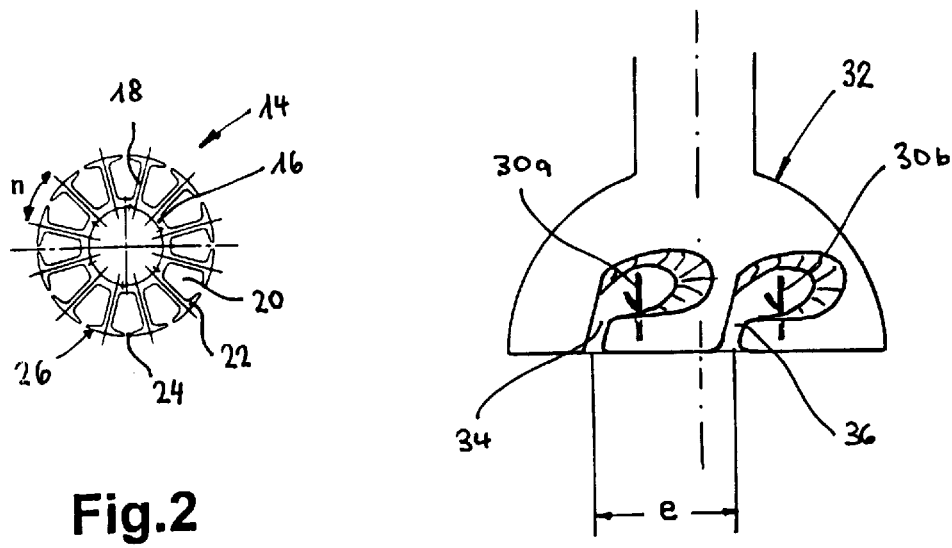
Fig.2
Fig.3

DEVICE FOR WINDING COILS IN AXIAL GROOVES OF ROTATIONALLY SYMMETRICAL BODIES OF ELECTRIC EQUIPMENT

BACKGROUND OF THE INVENTION

1. Field of the Invention

The invention pertains to a device for winding coils from at least two parallel guided winding wires in axial grooves that are arranged on the outer circumference of rotationally symmetrical bodies of electric equipment and for looping the winding wires around two contact hooks that are annularly arranged on the end surface of the body and separated from one another, wherein the winding wires are inserted into the grooves by a winding arm that can be turned about a rotational axis that lies perpendicular to the rotational axis of the body.

2. Description of the Prior Art

In one known method for winding coils of commutator armatures, the wire is inserted into pairs of axial grooves that lie opposite one another by means of rotating winding arms. As soon as the winding of a coil is completed, the armature is turned about its rotational axis in order to wind the next coil, such that the pair of grooves for accommodating the next coil is situated in the correct winding position relative to the winding arm. The insertion of the wire by means of the rotating winding arms is realized with winding accessories that serve as an aid for inserting the wire. One example of such a device is disclosed in European Patent Application No. 0,703,658.

In stators of so-called electronic motors, the individual coils are respectively wound around a sheet metal tooth of the stator, i.e., the wire of one coil winding is inserted into adjacent axial grooves. In order to manufacture such a winding in mechanized fashion, European Patent No. 97810305.9 proposes to turn the body that is to receive the windings about its rotational axis by at least one groove division after the insertion of the wire into a first groove, wherein the insertion into the first groove is realized in the form of a first pivoting motion of the winding arm about its rotational axis. Subsequently, the wire is inserted into a second groove by means of a second pivoting motion that takes place in the opposite direction of the first pivoting motion, whereafter the wire is guided back to the beginning of the first groove in order to form a coil winding by additionally turning the body after the wire has been inserted into the second groove. Due to this combination of a pivoting motion of the winding arm and the subsequent rotation of the body, it is possible to insert the windings of a coil into directly adjacent grooves, i.e., to wind the coils around individual teeth or ridges that are separated by grooves. Although this method is particularly suitable for winding a coil around only one tooth, it is also possible to wind the wires into pairs of grooves that are separated by greater distances.

SUMMARY OF THE INVENTION

The present invention is based on the objective of developing a device of the initially mentioned type which allows a simple winding of coils from at least two parallel guided winding wires as well as the looping of the winding wires around two respective contact hooks that are separated in one processing step.

According to the invention, this objective is attained by arranging a wire guide with separated wire outlets for the two winding wires on the free end of the winding arm, wherein the wire guide can be turned between a winding position in which the winding wires essentially adjoin one another in parallel fashion so as to insert the wires into the grooves, and a looping position in which the winding wires are spread apart so as to loop the wires around the contact hooks.

The term "winding wires" not only pertains to one individual wire, but also to several wires that are simultaneously placed into the grooves in order to form a multiple coil.

Since the wire guide according to the invention is rotatable, the mutual distance between two winding wires can be automatically adapted to the desired position during the winding process and the process of looping the wires around the contact hooks.

The device according to the invention may, in principle, be equipped with arbitrary winding arms, e.g., a rotating winding arm. However, it is preferred to utilize a winding device, in which the winding arm carries out respective pivoting motions of approximately 180°. Here, the body to be provided with the windings is turned about its rotational axis by at least one groove division between the pivoting motions. A winding device of this type is disclosed in the aforementioned European Patent No. 97810305.9.

In one preferred embodiment of the device according to the invention, the wire guide is rigidly connected to the winding arm, and the winding arm can be turned about its longitudinal axis.

It is preferred that the contact hooks can be covered by a guide sleeve, wherein the guide sleeve can be turned between a winding position in which the winding wires temporarily adjoin a smooth surfaces of the guide sleeve during the winding process, and a looping position in which the winding wires can be inserted into guide slots arranged on the guide sleeve in order to loop the winding wires around the contact hooks. Here, the distance between the guide slots essentially corresponds to the distance between the contact hooks.

In another preferred embodiment of the device according to the invention, the guide sleeve can be covered with a cover sleeve in order to loop the wires around the contact hooks and disengage the winding wires from the guide slots. The cover sleeve may contain a guide finger in order to hold the winding wires in their spread-apart position.

All known rotors and stators of electric motors and generators in which the coils are inserted into axial grooves arranged on the other circumference of the stators or rotors can be wound with the device according to the invention. One particularly advantageous application pertains to the placement of coils around one or more teeth of stators used in so-called electronic motors.

BRIEF DESCRIPTION OF THE DRAWINGS

Additional advantages, characteristics and details of the invention result from the following description of preferred embodiments according to the accompanying drawings. These are shown schematically in:

FIG. 1, a partially sectioned side view of a winding machine;

FIG. 2, a cross section through the stator according to FIG. 1;

FIG. 3, a side view of a guide sleeve, and

FIG. 4, a partially sectioned side view of part of the winding machine according to FIG. 1, wherein the cover sleeve is attached and the wire guide is turned.

DETAILED DESCRIPTION OF THE PREFERRED EMBODIMENTS

The winding machine shown in FIG. 1 contains a switching apparatus 10 with a clamping tool for a stator 14. The stator 14 is clamped such that it can be turned about its rotational axis x which corresponds to the clamping axis of the switching apparatus 10.

The stator 14 which is shown in detail in FIG. 2 essentially consists of a tubular body 16 with teeth 18 that protrude radially outward from said body and form the axial grooves 20, i.e., the slots for accommodating a wire winding. The individual teeth 18 of the stator 14 have a free end 22 with a cross section in the approximate form of a T. The free ends 22 of the teeth 18 form the outer surface 26 of the stator 14 which is interrupted by slots 24 of the axial grooves 20 which serve for the insertion of the wires.

The simultaneous winding of the stator 14 with two winding wires 38a,b is realized with the aid of a winding arm 44 that is arranged on the not-shown shaft of a drive unit at an angle β relative to the rotational axis y. The winding arm 44 carries out pivoting motions of slightly more than 180°, wherein the stator 14 is turned by one groove division via the switching apparatus 10 between two respective pivoting motions during the winding process.

The winding wires 38a,b which may also consist of two wire bundles in order to wind a multiple coil are guided by a wire guide 50 arranged on the free end of the winding arm 44. The winding wires 38a,b which are unwound from a supply roll 46 are guided to the wire guide 50 via a central wire guide channel 48 in the winding arm 44 and then to two wire outlet openings 54a,b that are separated by a distance, a via deflection rollers 52.

The wire guide 50 is rigidly connected to the winding arm 44. The winding arm 44 and consequently the wire guide 50 can be turned about the longitudinal axis s of the winding arm 44. In the winding position of the wire guide 50 which is shown in FIG. 1, the winding wires 38a,b essentially adjoin one another in parallel fashion so as to insert the wires into the grooves 20 of the stator 14.

An annular insulating body 28 that contains a number of annularly arranged contact hooks 30 which corresponds to the number of grooves 20 is arranged on the end surface of the stator 14. A guide sleeve 32 that is shown in detail in FIG. 3 covers these contact hooks 30. The guide sleeve 32 has a smooth surface and covers the contact hooks 30 in this winding position. The guide sleeve allows an unobstructed insertion of the winding wires 38a,b into the axial grooves 20 of the stator 14. The contact sleeve 32 also contains two guide slots 34, 36 that are separated. The distance e between the two guide slots 34, 36 essentially corresponds to the distance between the adjacent contact hooks 30a,b, around which the wires are to be looped.

After winding one or more coils around the teeth 18 of the stator 14, the guide sleeve 32 is turned in such a way that the contact hooks 30a,b, around which the wires are to be looped are positioned relative to the guide slots 34, 36 such that the winding wires 38a,b inserted into the guide slots 34, 36 can be looped around the contact hooks 30a,b. After the winding wires 38a,b are inserted into the guide slots 34, 36 in this position of the guide sleeve 32, said guide sleeve is turned in such a way that the winding wires 38a,b can be guided over the contact hooks 30a,b.

In order to insert the winding wires 38a,b into the guide slots 34, 36, the winding wires must be spread apart ahead of time. This is realized in the form of a forward rotation of the wire guide 50 into the position shown in FIG. 4.

The looping of the contact hooks 30a,b is completed by means of a cover sleeve 40 that temporarily covers the guide sleeve 32. This cover sleeve serves for disengaging the winding wires 38a,b from the guide slots 34, 36 of the guide sleeve 32. In order to hold the winding wires 38a,b in their spread-apart position during the looping process, the cover sleeve 40 is provided with a guide finger 42 that engages between the winding wires 38a,b.

In the embodiment shown in the figures, only one winding arm is provided. However, the present invention is not limited to arrangements that contain only one winding arm. The invention is also not limited to winding arms that carry out pivoting motions.

What is claimed is:

1. A device for winding coils from at least two parallel guided winding wires into axial grooves arranged on an outer circumference of a rotationally symmetrical body of electric equipment, and for looping the winding wires around two contact hooks that are annularly arranged and separated from one another on an end surface of said rotationally symmetrical body, said device comprising:

a winding arm that is rotatable about a rotational axis (y) which lies perpendicular to the rotational axis (x) of the said rotationally symmetrical body, for inserting the winding wires into said axial grooves, said winding arm having a wire guide with separated wire outlets for the two winding wires arranged on a free end thereof, said wire guide being rotatable between a winding position in which the winding wires adjoin one another in essentially parallel fashion so as to insert the winding wires into said axial grooves, and a looping position in which the winding wires are spread apart so as to loop the winding wires around the contact hooks.

2. A device according to claim 1, wherein said wire guide is rigidly connected to the winding arm, and wherein the winding arm is rotatable about its longitudinal axis.

3. A device according to claim 2, further comprising a guide sleeve whereby said contact hooks can be covered by said guide sleeve, wherein the guide sleeve is rotatable between a winding position in which the winding wires temporarily adjoin a smooth surface of the guide sleeve during winding, and a looping position in which the winding wires are inserted into guide slots arranged on the guide sleeve so as to loop the wires around the contact hooks.

4. A device according to claim 3, wherein the distance (e) between the guide slots essentially corresponds to the distance between the contact hooks.

5. A device according to claim 4, further comprising a cover sleeve whereby said guide sleeve can be covered in order to loop the wires around the contact hooks and disengage the winding wires from the guide slots.

6. A device according to claim 5, wherein said cover sleeve contains a guide finger for holding the winding wires in their spread-apart position.

7. A device according to claim 3, further comprising a cover sleeve whereby said guide sleeve can be covered in order to loop the wires around the contact hooks and disengage the winding wires from the guide slots.

8. A device according to claim 7, wherein said cover sleeve has an external guide finger for holding the winding wires in their spread-apart position.

9. A device according to claim 1, further comprising a guide sleeve whereby said contact hooks can be covered by said guide sleeve, wherein the guide sleeve is rotatable between a winding position in which the winding wires temporarily adjoin a smooth surface of the guide sleeve during winding, and a looping position in which the winding wires are inserted into guide slots arranged on the guide sleeve so as to loop the wires around the contact hooks.

10. A device according to claim 9, wherein the distance (e) between the guide slots essentially corresponds to the distance between the contact hooks.

11. A device according to claim 10, further comprising a cover sleeve whereby said guide sleeve can be covered in order to loop the wires around the contact hooks and disengage the winding wires from the guide slots.

12. A device according to claim 11, wherein said cover sleeve has an external guide finger for holding the winding wires in their spread-apart position.

13. A device according to claim 9, further comprising a cover sleeve whereby said guide sleeve can be covered in order to loop the wires around the contact hooks and disengage the winding wires from the guide slots.

14. A device according to claim 13, wherein said cover sleeve has an external guide finger for holding the winding wires in their spread-apart position.

15. Utilization of a device for winding coils around one or more teeth of stators for electronic motors, said device being a device for winding coils from at least two parallel guided winding wires into axial grooves arranged on an outer circumference of a rotationally symmetrical body of electric equipment, and for looping the winding wires around two contact hooks that are annularly arranged and separated from one another on an end surface of said rotationally symmetrical body, said device comprising:

a winding arm that is rotatable about a rotational axis (y) which lies perpendicular to the rotational axis (x) of the said rotationally symmetrical body, for inserting the winding wires into said axial grooves, said winding arm having a wire guide with separated wire outlets for the two winding wires arranged on a free end thereof, said wire guide being rotatable between a winding position in which the winding wires adjoin one another in essentially parallel fashion so as to insert the winding wires into said axial grooves, and a looping position in which the winding wires are spread apart so as to loop the winding wires around the contact hooks.

* * * * *